United States Patent
Ivakitch et al.

(10) Patent No.: US 10,954,817 B2
(45) Date of Patent: Mar. 23, 2021

(54) METHOD OF SEPARATING AND SEALING MULTI FILM DAMPER RINGS

(71) Applicant: PRATT & WHITNEY CANADA CORP., Longueuil (CA)

(72) Inventors: Richard Ivakitch, Scarborough (CA); David Beamish, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/657,126

(22) Filed: Oct. 18, 2019

(65) Prior Publication Data
US 2021/0025290 A1    Jan. 28, 2021

Related U.S. Application Data
(60) Provisional application No. 62/878,770, filed on Jul. 26, 2019.

(51) Int. Cl.
| | | |
|---|---|---|
| *F16C 27/04* | (2006.01) | |
| *F01D 25/16* | (2006.01) | |
| *F16C 19/24* | (2006.01) | |

(52) U.S. Cl.
CPC .......... *F01D 25/164* (2013.01); *F16C 19/24* (2013.01); *F16C 27/045* (2013.01);
(Continued)

(58) Field of Classification Search
CPC ... F16C 27/045; F16C 2360/23; F01D 25/164
See application file for complete search history.

(56) References Cited

U.S. PATENT DOCUMENTS

| | | | | |
|---|---|---|---|---|
| 3,304,802 A | * | 2/1967 | Kofink | F16C 27/066 464/180 |
| 3,499,691 A | * | 3/1970 | Baier | F16C 32/067 384/119 |

(Continued)

*Primary Examiner* — Phillip A Johnson
(74) *Attorney, Agent, or Firm* — Norton Rose Fulbright Canada LLP

(57) ABSTRACT

A multi-film oil damper for accommodating radial movement of a rotary shaft bearing relative to a bearing housing, the multi-film oil damper comprising: an annular damper cavity defined within the bearing housing between a radially outward wall, a first radially extending side wall and a second radially extending side wall, the annular damper cavity having an oil inlet in the radially outward wall, the oil inlet being in communication with a source of pressurized oil; an inner damper ring having axial ends abutting the first and second radially extending side walls of the annular damper cavity; a plurality of outer damper rings coaxially nested between the inner damper ring and the radially outward wall, each outer damper ring having axial ends adjacent the first and second radially outward walls of the annular damper cavity, each outer damper ring having a first cylindrical surface and a second cylindrical surface; a spacer ring disposed at each axial end of the plurality of outer damper rings, a contact surface of the spacer ring extending radially beyond the first surface of an associated outer damper ring and engaging the second surface of an adjacent outer damper ring defining an oil filled gap there between; and a radial oil channel through a central portion of the plurality of outer damper rings in fluid communication with the oil inlet.

21 Claims, 3 Drawing Sheets

(52) U.S. Cl.
CPC ...... *F05D 2220/32* (2013.01); *F05D 2240/54* (2013.01); *F05D 2260/96* (2013.01)

(56) References Cited

U.S. PATENT DOCUMENTS

| | | | |
|---|---|---|---|
| 4,214,796 | A | 7/1980 | Monzel et al. |
| 4,289,360 | A * | 9/1981 | Zirin ................... F16F 15/0237 384/462 |
| RE31,394 | E | 9/1983 | Streifert |
| 4,992,024 | A * | 2/1991 | Heydrich .............. F01D 25/164 384/99 |
| 5,071,262 | A | 12/1991 | Monzel et al. |
| 5,207,511 | A | 5/1993 | Bobo |
| 5,228,784 | A | 7/1993 | Bobo |
| 8,342,796 | B2 | 1/2013 | Spencer et al. |
| 9,879,750 | B2 | 1/2018 | Husband et al. |
| 10,077,713 | B2 | 9/2018 | Gysling et al. |
| 10,233,778 | B2 | 3/2019 | Gysling et al. |
| 2003/0007705 | A1* | 1/2003 | Bosen .................... F16C 19/54 384/99 |
| 2009/0263057 | A1* | 10/2009 | Kanki ...................... B23H 9/00 384/99 |
| 2018/0128124 | A1 | 5/2018 | Avis et al. |

\* cited by examiner

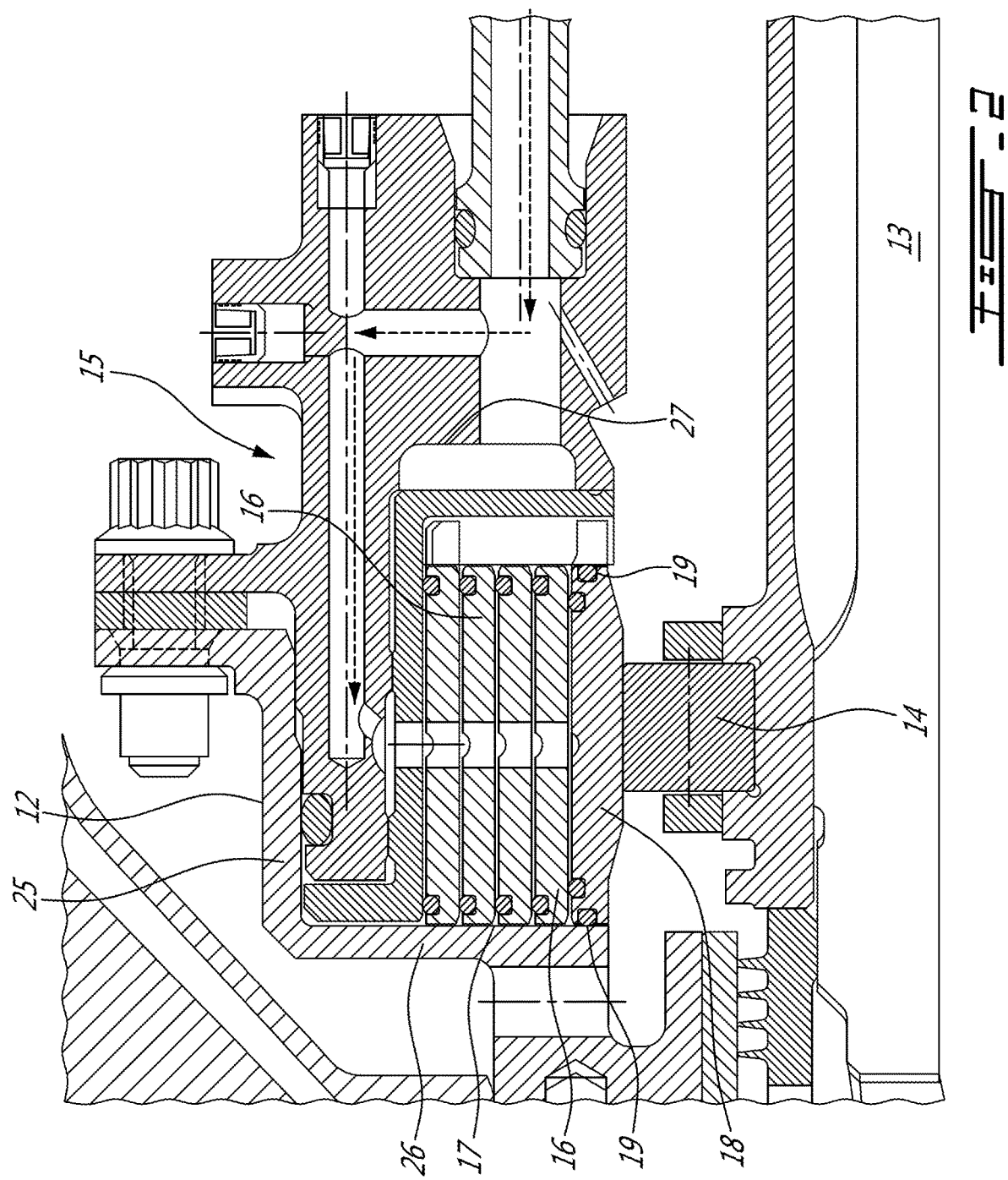

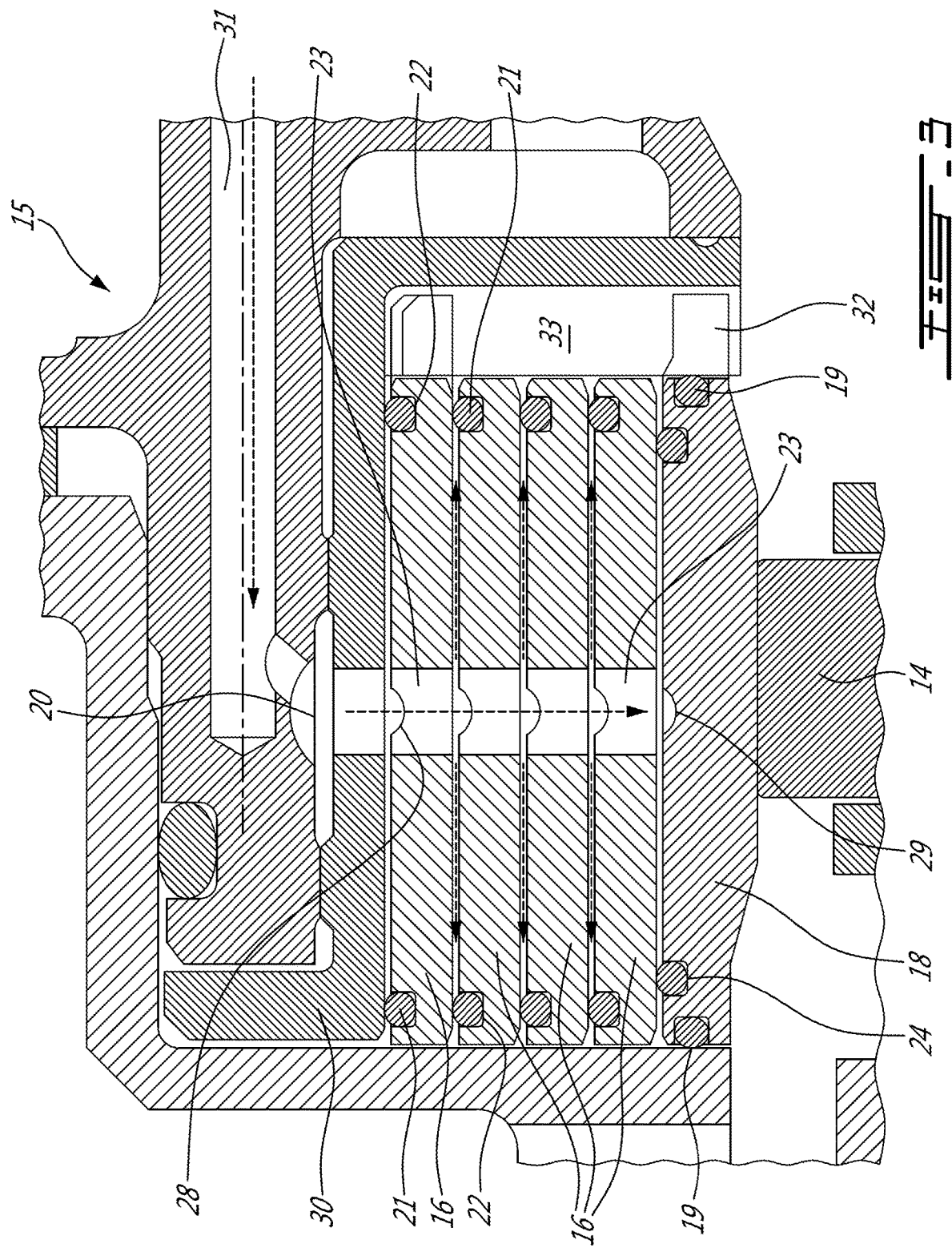

US 10,954,817 B2

METHOD OF SEPARATING AND SEALING MULTI FILM DAMPER RINGS

CROSS-REFERENCE TO RELATED APPLICATIONS

This application claims priority to U.S. provisional patent application No. 62/878,770 filed Jul. 26, 2019, the entire contents of which are incorporated by reference herein.

TECHNICAL FIELD

The disclosure relates to a multi-film damper system suited for use within a bearing housing of a gas turbine engine.

BACKGROUND

Oil dampers or squeeze film dampers can be used to accommodate radial movement of the rotor shaft and bearings. For instance, multi-film oil dampers may be placed in a coaxial nested series with the rotor system bearing supports to provide damping to a rotor system and, thus, reduce vibrations that would otherwise be present in the system.

For proper function of an oil film damper with multiple films, each of the films between adjacent coaxial nested damper rings must be supplied with sufficient oil. In a multi-film damper, the flow of oil must fill gaps between rings to create individual oil films between each damper ring. Imbalanced rotation of the shaft and bearings will alternately compress and decompress the oil films during damping.

Under certain conditions, such as during start-up, it might be challenging to provide for a continuous supply flow of pressurized oil so as to ensure that oil films are maintained. Improvement is desirable.

SUMMARY

The disclosure describes a multi-film oil damper in a gas turbine engine, comprising: a housing defining an annular damper cavity having an oil inlet in communication with a source of pressurized oil; a plurality of nested damper rings disposed within the annular damper cavity, the plurality of nested damper rings defining a plurality of squeeze film annuli, the nested damper rings having respective radially inner surfaces and radially outer surfaces; at least one spacer ring disposed between adjacent nested damper rings of the plurality of nested damper rings and extending between the radially outer surface and the radially inner surface of the adjacent damper rings; and a radial oil channel in fluid communication between the oil inlet and the plurality of nested damper rings.

In accordance with another feature, there is provided a method of supplying oil to a multi-film oil damper comprising: providing a plurality of coaxial nested outer damper rings disposed in an oil damper cavity of the bearing housing and sealed with an inner damper ring, flooding the oil damper cavity with oil via an oil inlet; spacing the coaxial nested outer damper rings apart with spacer rings to define oil filled gaps there between; and providing a radial oil channel through a central portion of the plurality of outer damper rings in fluid communication with the oil inlet.

Further details of these and other aspects of the subject matter of this application will be apparent from the detailed description included below and the drawings.

DESCRIPTION OF THE DRAWINGS

FIG. 2 is a sectional view along an axial radial plane through a multi-film damper in accordance with the present description showing spacer rings that separate and seal between coaxial nested damper rings.

FIG. 3 is a detailed sectional view of the damper of FIG. 2.

DETAILED DESCRIPTION

Figure 1:
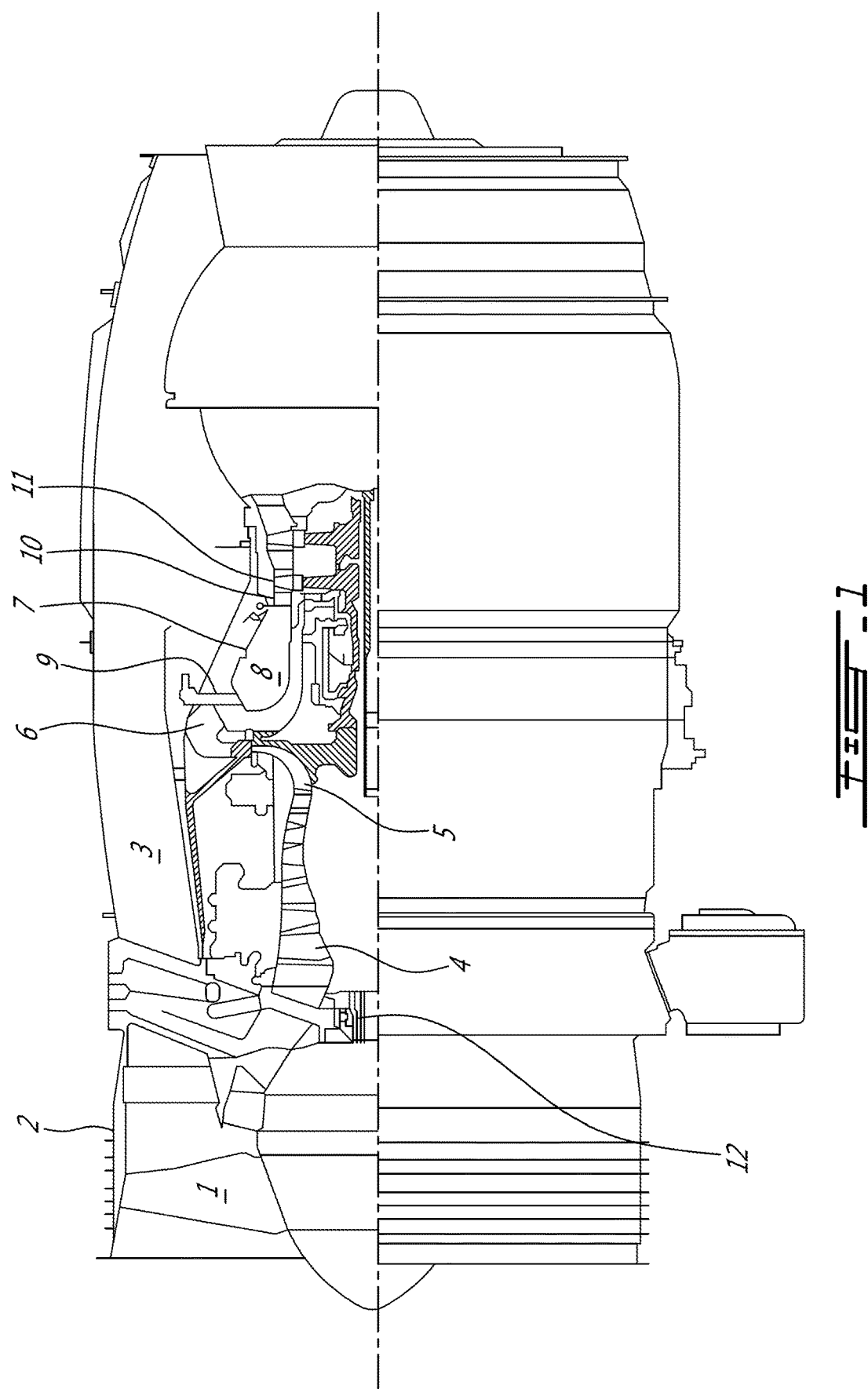
FIG. 1 shows an axial cross-section view of an example turbo-fan gas turbine engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

FIG. 1 shows a forward bearing housing 12. FIG. 2 shows a sectional view along an axial radial plane with the forward bearing housing 12 supporting a low pressure spool shaft 13 on roller bearings 14. FIG. 2 shows an axial section through a multi-film damper 15 in accordance with the present description that accommodates radial movement of the rotary shaft 13 and roller bearings 14 relative to a bearing housing 12. Radial movement is dampened by the oil films between the four outer damper rings 16.

As seen in FIG. 3, the multi-film oil damper 15 accommodates radial movement of the rotary shaft 13 and roller bearings 14 relative to the bearing housing 12 using a plurality of coaxial nested outer damper rings 16 disposed in the oil damper cavity 17 of the bearing housing 12. In the example, four outer damper rings 16 are shown however any number can be used. The outer damper rings 16 are sealed within the oil damper cavity 17 with an inner damper ring 18 and radially sliding seals 19. The oil damper cavity 17 is filled with oil injected under pressure through the oil inlet 20 (FIG. 3).

The penetration of oil between damper rings can be inhibited by inertia and by the surface tension of the oil coating the adjacent ring surfaces which can cause the rings sticking together. Especially during start-up of the pressurized oil circulating system, there may be difficulty in oil passing between damper rings. As a result oil film formation may be impeded.

As shown in FIG. 3, each outer damper ring 16 includes a spacer ring 21 disposed at each axial end within an annular groove 22 in an outer cylindrical surface. The spacer rings 21 serve to separate the outer damper rings 16 and allow oil to penetrate into the gap formed between the coaxial nested outer damper rings 16. The spacer rings 16 can also serve to seal oil within the gap which flows from the oil inlet 20 as indicated with arrows in FIG. 3. The outer damper rings 16 can include a radial oil channel 23 through a central portion of each outer damper ring 16 in fluid communication with the oil inlet 20 to distribute oil to each cylindrical surface of the outer damper rings 16. The inner damper ring 18 serves as the outer race for the roller bearings 14 and also includes spacer rings 24 to form an oil filled gap with the adjacent outer damper ring 16. Oil will eventually leak past the spacer rings 21, 24 and past the radial sliding seals 19 into the area surrounding the roller bearings 14. Oil is scavenged from the bearing housing 12 and recycled by the oil circulating system of the engine.

Referring to FIG. 2, the annular oil damper cavity 17 is defined within the bearing housing 12 between a radially outward wall 25, a first radially extending side wall 26 and a second radially extending side wall 27. The inner damper ring 18 has axial ends abutting the first and second radially extending side walls 26, 27 and is sealed with radially sliding seals 19 to contain the pressurized oil. The outer damper rings 16 are coaxially nested between the inner damper ring 18 and the radially outward wall 25. Each outer damper ring 16 has axial ends adjacent the first and second radially outward walls 26, 27 of the annular damper cavity 17.

As shown in FIG. 3, each outer damper ring 16 has an outer cylindrical surface and an inner cylindrical surface that is coated with oil. The oil coating is retained by the sealing action of the spacer rings 21 and 24. Within an annular circumferential groove 22, each spacer ring 21 disposed at each axial end of the outer damper rings 16 has a sealing contact surface extending radially beyond the outer surface of an associated outer damper ring 16 and engaging the inner surface of an adjacent outer damper ring 16 defining an oil filled gap there between.

A radial oil channel 23 through a central portion of each outer damper ring 16 is in fluid communication with the oil inlet 20 and distributes oil radially to coat the surfaces of the outer damper rings 16. To distribute oil circumferentially about the surfaces of the outer damper rings 16, a circumferential oil distribution channel 28 can be provided in each outer damper ring 16. The inner damper ring 18 can include an oil drainage channel 29 to receive and distribute oil between the inner damper ring 18 and the adjacent outer damper ring 16.

The spacer rings 21, 24 can be an elastomeric O-ring or a metal split ring. The spacer rings 21, 24 should be relatively flexible to avoid interfering with the flexible movement of the outer damper rings 16. In the example shown in FIGS. 2-3, the oil inlet 20 includes a flow restrictor ring 30 between the supply bore 31 to the oil inlet 20 and the outer damper rings 16. The flow restrictor ring 30 directs the flow of oil and controls oil pressure to the annular oil damper cavity 17. As seen in FIG. 3, the inner damper ring 18 can include an anti-rotation tab 32 engaged in a radially extending oil gallery 33 within the annular damper cavity 17.

Accordingly supplying oil to the multi-film oil damper 15 includes providing a plurality of coaxial nested outer damper rings 16 disposed in an oil damper cavity 17 of the bearing housing 12 and sealed with an inner damper ring 18. The oil damper cavity 17 is flooded with oil under pressure via the oil inlet 20. The coaxial nested outer damper rings 16 are spaced apart with spacer rings 21 to define oil filled gaps adjacent to each cylindrical surface of each outer damper ring 16. A radial oil channel 23 is provided through a central portion of each outer damper ring 16 in fluid communication with the oil inlet 20 to distribute oil radially within the annular oil damper cavity 17. A circumferential oil distribution channel 28 on each outer damper ring 16 can distribute oil circumferentially.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A multi-film oil damper in a gas turbine engine, comprising:
   a housing defining an annular damper cavity having an oil inlet in communication with a source of pressurized oil;
   a plurality of nested damper rings disposed within the annular damper cavity, the plurality of nested damper rings defining a plurality of squeeze film annuli, the nested damper rings having respective radially inner surfaces and radially outer surfaces;
   at least one spacer ring disposed between adjacent nested damper rings of the plurality of nested damper rings and extending between the radially outer surface and the radially inner surface of the adjacent damper rings; and
   a radial oil channel in fluid communication between the oil inlet and the plurality of nested damper rings.

2. The multi-film oil damper according to claim 1 wherein the radially outer surface includes an annular groove in which the spacer ring is seated.

3. The multi-film oil damper according to claim 1 wherein the plurality of nested damper rings includes a circumferential oil distribution channel.

4. The multi-film oil damper according to claim 1 wherein the plurality of nested damper rings includes a radially innermost damper ring having an oil drainage channel.

5. The multi-film oil damper according to claim 4 wherein the radially innermost damper ring includes an anti-rotation tab engaged in a radially extending oil gallery within the annular damper cavity.

6. The multi-film oil damper according to claim 4 wherein the radially innermost damper ring comprises an outer race of the rotary shaft bearing.

7. The multi-film oil damper according to claim 6 wherein opposed ends of the radially innermost damper ring are radially slidingly sealed with first and second radially extending side walls of the annular damper cavity.

8. The multi-film oil damper according to claim 1 wherein the at least one spacer ring is selected from a group consisting of: an elastomeric O-ring and a metal split ring.

9. The multi-film oil damper according to claim 1 wherein the oil inlet includes a flow restrictor between the oil inlet and the plurality of nested damper rings.

10. The multi-film oil damper according to claim 1 wherein the at least one spacer ring comprises first and second damper rings disposed adjacent opposed ends of the adjacent nested damper rings.

11. The multi-film oil damper according to claim 10, wherein the radial oil channel extends through a central portion of the plurality of nested damper rings axially between the first and second damper rings.

12. A multi-film oil damper for accommodating radial movement of a rotary shaft bearing relative to a bearing housing, the multi-film oil damper comprising:
- a plurality of coaxial nested outer damper rings disposed in an oil damper cavity of the bearing housing and sealed with an inner damper ring, the oil damper cavity having an oil inlet;
- each outer damper ring including a spacer ring disposed at each axial end thereof within a first cylindrical surface and having a radial oil channel through a central portion of the plurality of outer damper rings in fluid communication with the oil inlet.

13. The multi-film oil damper according to claim 12, wherein the first cylindrical surface of each outer damper ring includes an annular groove in which the spacer ring is seated.

14. The multi-film oil damper according to claim 12, wherein the plurality of nested outer damper rings includes a circumferential oil distribution channel.

15. The multi-film oil damper according to claim 12 wherein the plurality of nested outer damper rings includes a radially innermost damper ring having an oil drainage channel.

16. The multi-film oil damper according to claim 15 wherein the radially innermost damper ring includes an anti-rotation tab engaged in a radially extending oil gallery within the annular damper cavity.

17. The multi-film oil damper according to claim 15 wherein the radially innermost damper ring comprises an outer race of the rotary shaft bearing.

18. The multi-film oil damper according to claim 17 wherein opposed ends of the radially innermost damper ring are radially slidingly sealed with first and second radially extending side walls of the annular damper cavity.

19. The multi-film oil damper according to claim 12 wherein the spacer ring is selected from a group consisting of: an elastomeric O-ring and a metal split ring.

20. The multi-film oil damper according to claim 12 wherein the oil inlet includes a flow restrictor between the oil inlet and the plurality of nested outer damper rings.

21. A method of supplying oil to a multi-film oil damper comprising:
- providing a plurality of coaxial nested outer damper rings disposed in an oil damper cavity of the bearing housing and sealed with an inner damper ring,
- flooding the oil damper cavity with oil via an oil inlet;
- spacing the coaxial nested outer damper rings apart with spacer rings to define oil filled gaps there between; and
- providing a radial oil channel through a central portion of the plurality of outer damper rings in fluid communication with the oil inlet.

* * * * *